United States Patent [19]
Baughman

[11] Patent Number: 5,660,340
[45] Date of Patent: Aug. 26, 1997

[54] ROTARY DE-ICER

[75] Inventor: Dean E. Baughman, South Lehi, Utah

[73] Assignee: Beehive, Inc., Sandy, Utah

[21] Appl. No.: 620,849

[22] Filed: Mar. 20, 1996

[51] Int. Cl.⁶ ............................................. B02C 17/02
[52] U.S. Cl. ..................... 241/74; 241/79.3; 241/172
[58] Field of Search ..................... 241/79.3, 74, 171, 241/172, 182

[56] References Cited

U.S. PATENT DOCUMENTS

| | | | |
|---|---|---|---|
| 770,823 | 9/1904 | Salzmann | 241/176 X |
| 2,237,078 | 4/1941 | Lilly | 241/79.3 |
| 3,658,263 | 4/1972 | Zeisler et al. | 241/56 |
| 4,378,036 | 3/1983 | Williams | 241/79.3 X |
| 4,538,767 | 9/1985 | Pimley | 241/79.3 |
| 4,635,860 | 1/1987 | Kruyer | 241/23 |
| 4,896,835 | 1/1990 | Fahrenholz | 241/74 |
| 5,062,601 | 11/1991 | Graf | 241/79.3 |

Primary Examiner—John M. Husar
Attorney, Agent, or Firm—Watson Cole Stevens Davis, P.L.L.C.

[57] ABSTRACT

A rotary de-icer for separating ice particles from comestible products covered with such particles, comprises a perforate drum mounted on an upstanding frame for rotation about a central axis of the drum, the drum having a cylindrical side wall comprising an assembly of elements parallel to the central axis and extending between opposing ends of the drum. The elements are mutually spaced apart to define uniform gaps through which separated ice particles fall by gravity upon being tumbled during drum rotation causing the ice-covered products to impact against the drum side wall elements which have continuous arcuate surfaces facing inwardly of the drum presenting a plurality of curved surfaces.

10 Claims, 2 Drawing Sheets

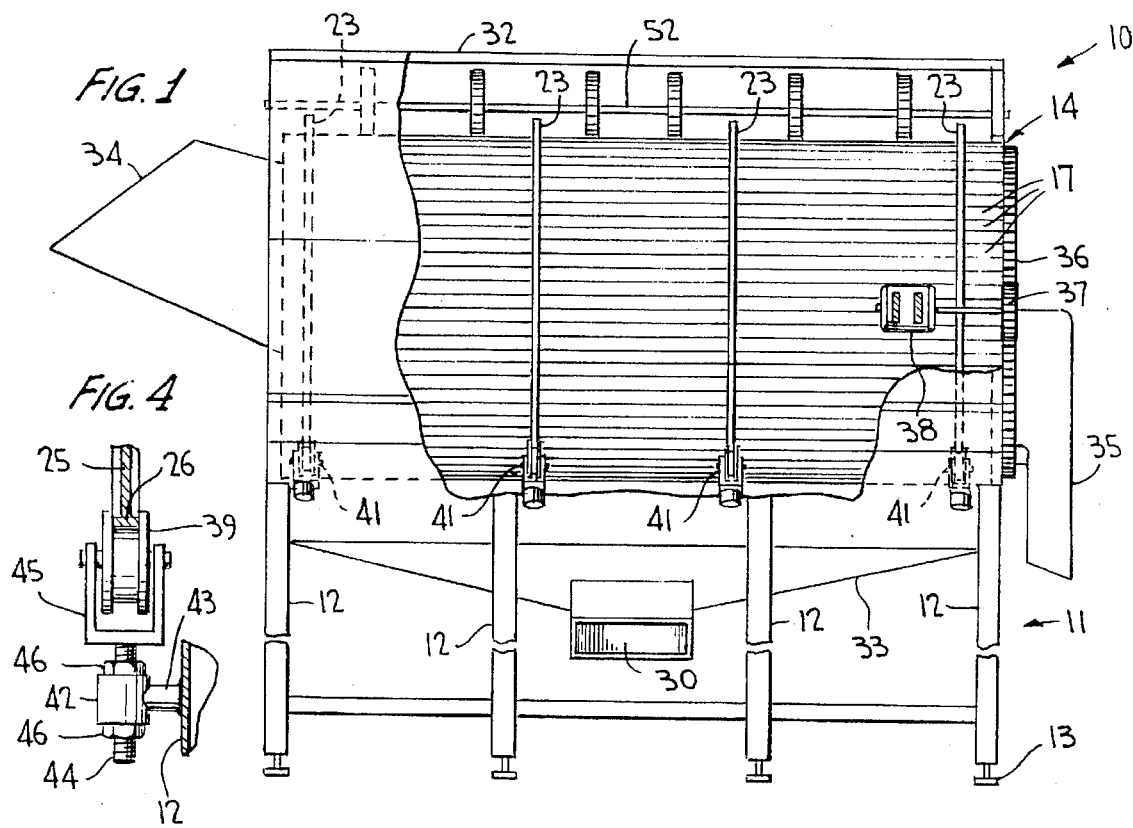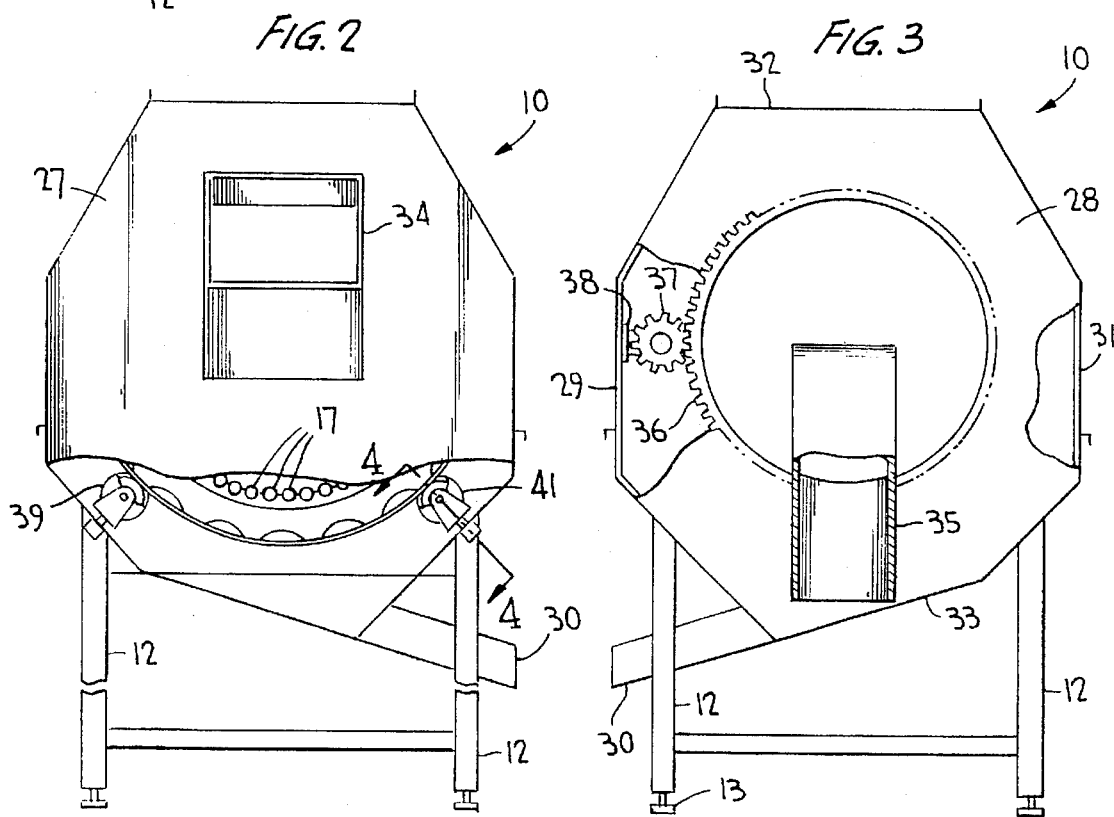

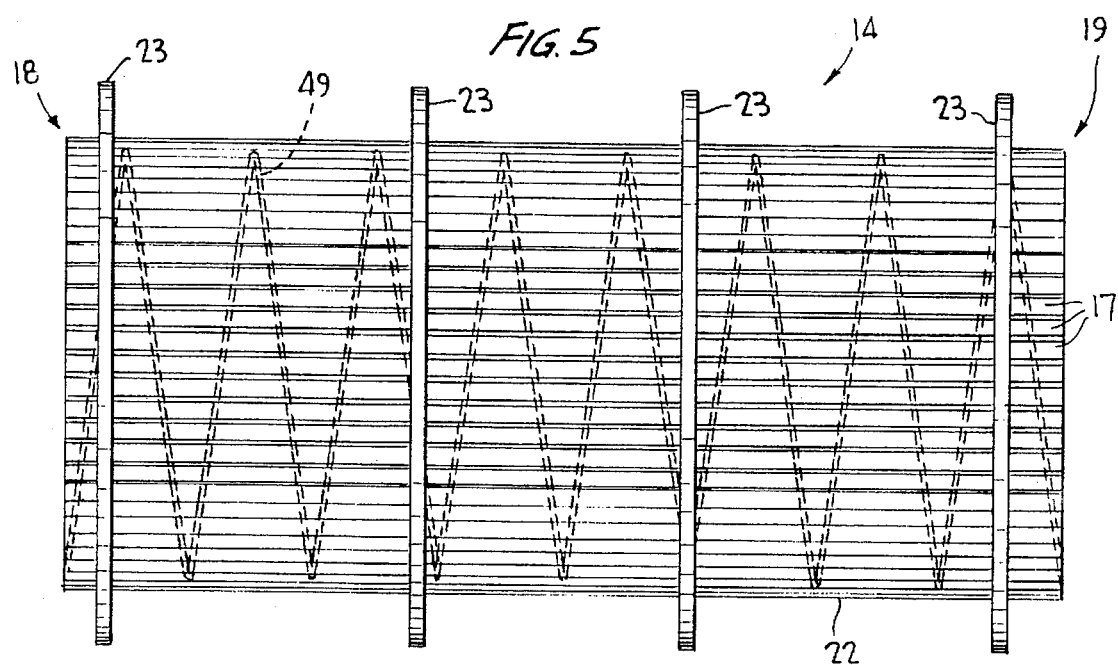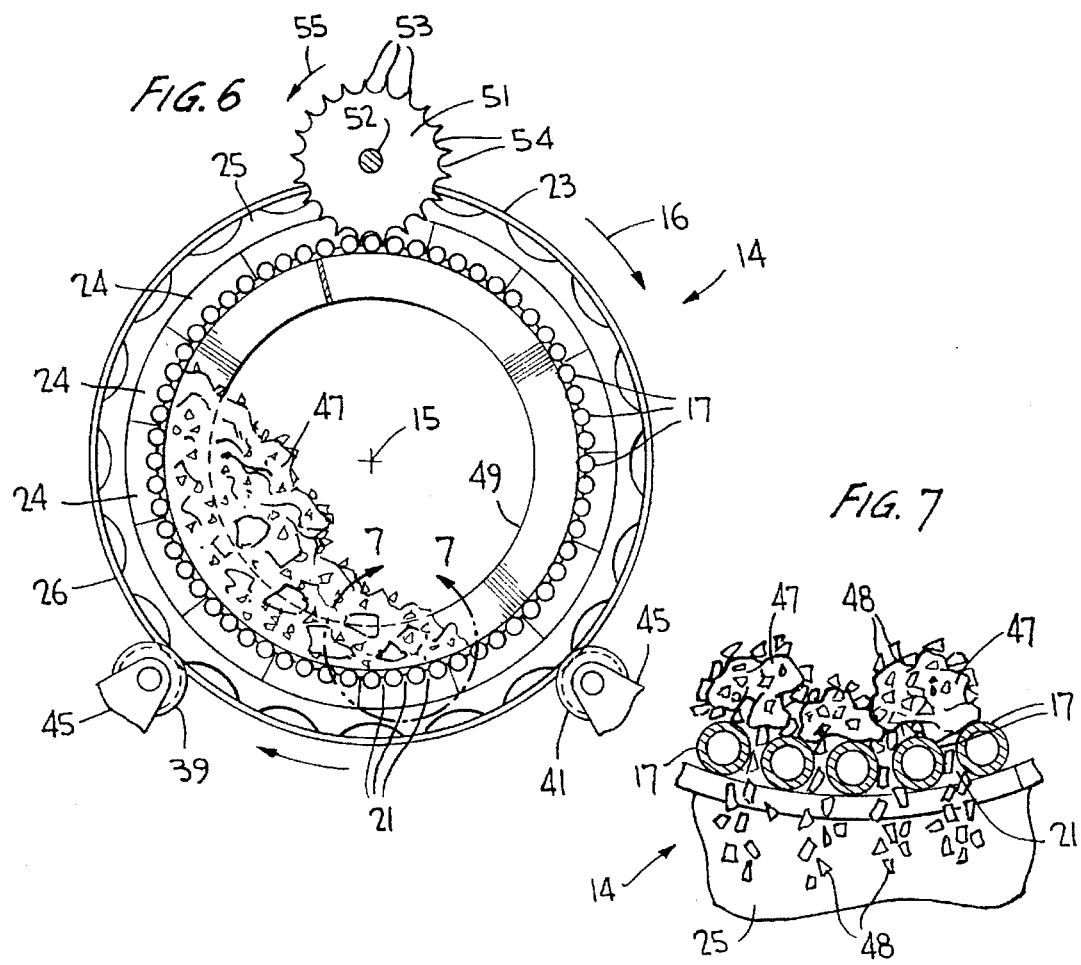

5,660,340

ROTARY DE-ICER

BACKGROUND OF THE INVENTION

This invention relates generally to a tumbler in the form of a rotary perforate drum for separating ice particles from comestible products such as poultry and fruit covered with such ice particles.

More particularly, the drum side wall comprises an assembly of tubular elements each lying parallel to the central axis of the drum, and each being mutually spaced apart to define uniform gaps or slots through which separated ice particles fall from the drum. Such elements have continuous arcuate surfaces along the length thereof facing inwardly of the drum presenting a plurality of curved surfaces against which the ice-covered products are tumbled for freeing the ice particles therefrom.

Typically, during a poultry processing operation, the primal parts, such as the breasts, legs and thighs, are removed by cutting, whereafter the breasts shells and necks are layered in corrugated tote bins usually with shaved ice to keep the products cool during transport. The ice covered products are transported to a meat separator facility at which the meat is recovered from the breast shells and necks.

At the meat separator facility the ice, which may now be in clumps, must be removed from the breast shells and necks before these products are fed into the separator to minimize the water content in the finished product.

Known procedures are available for this purpose in which the ice covered products are deposited on a static perforated table where the ice is manually separated from the products while the ice is permitted to drop through the table perforations. Otherwise, vibratory, double-deck conveyors are provided such that the ice covered products are deposited on the upper conveyor which is slotted, allowing the ice to pass through while product is conveyed and vibrated. The lower conveyor, which is unperforated, conveys the collected ice particles to an ice collecting station.

However, either approach taken in the prior art is inefficient, labor intensive and produces meat loss given that many ice covered products remain ice laden and unsatisfactory for the meat separation process. Besides, portions of the meat or skin tend to clog the table or conveyor perforations such that much of the separated ice never drops through the perforations but commingles with the meat products, which is totally undesirable.

A more efficient, less labor intensive and more reliable de-icer is needed for especially the poultry processing industry.

SUMMARY OF THE INVENTION

It is an object of the present invention to provide a rotary de-icer designed to provide a reliable means of separating ice from poultry sections and from other comestible products prior to further processing operations, in an efficient, economical and time-saving manner.

The de-icer comprises a rotary drum mounted for rotation about its central axis, and having open infeed and product outlet ends. The drum comprises a perforate cylindrical side wall formed by a plurality of interconnected hollow tubes or the like lying parallel to the central axis of the drum and extending between opposing ends of the drum. The tubes are mutually spaced apart to define uniform gaps or slots each of a predetermined width depending on the specific application of use.

Ice-covered products are fed into the drum through its infeed end, and the products are tumbled upon drum rotation effected by a rotary drive. The tumbled products impact against the rounded surfaces of the tubes forming the cylindrical side wall such that the clinging ice particles are thereby separated during this tumbling action whereupon the separated ice particles fall by gravity through the gaps or slots formed between the tubes and into an ice collecting station. The ice-free products advance through the drum toward and through the outlet end generally free of any clinging ice particles.

A helical flange may be mounted within the drum between its inlet an outlet ends in engagement with the inner curved surfaces of the hollow tubes to control the advance of product through the drum before ice removal is effected, and to assure the forward advancing movement of products within the drum.

The tubes forming the cylindrical side wall of the drum are assembled by a plurality of ring means spaced along the drum axis. The ring means have outer ring surfaces for roller supporting the drum on an upstanding frame.

Freely rotatable means such as a star wheel or wheels may be mounted on the frame outwardly of the drum for engagement with the tubes so as to be rotated by the drum about an axis parallel to the drum axis. The star wheel or wheels have projections extending into the gaps for dislodging any products or portions thereof which may be lodged in the gaps during the tumbling action. The star wheel or wheels may be disposed at a location above the drum to cause the dislodged products to drop under gravity into the interior of the drum during rotation.

Other objections, advantages and novel features of the invention will become more apparent from the following detailed description of the invention when taken in conjunction with the accompanying drawings.

BRIEF DESCRIPTION OF THE DRAWINGS

FIG. 1 is a side elevational view, partly broken away, of the rotary de-icer unit according to the invention shown mounted on a suitable upstanding frame;

FIG. 2 is an end elevational view, partly broken away, of the de-icer unit of FIG. 1 taken at its inlet end;

FIG. 3 is an end elevational view, partly broken away, of the de-icer unit of FIG. 1 taken at its outlet end;

FIG. 4 is an enlarged detail view of one of the support rollers for the drum in rolling engagement with a ring surface of one of the ring means provided for assembling the tubes together;

FIG. 5 is a side elevational view, at an enlarged scale, of the rotary drum according to the invention;

FIG. 6 is an end elevational view of the FIG. 5 drum showing a pair of cradle support rollers and a star wheel; and FIG. 7 is a cross-sectional view, at an enlarged scale, taken substantially along the line 7—7 of FIG. 6, to illustrated the ice particle removal upon tumbling and the removed ice particles falling through the gaps formed between the spaced tubes.

DETAILED DESCRIPTION OF THE INVENTION

Turning now to the drawings wherein like reference characters refer to like and corresponding parts throughout the several views, the rotary de-icer assembly according to the invention is generally designated 10 in FIGS. 1, 2 and 3 as comprising in upstanding frame 11 comprising a suitable number of upstanding frame legs 12 which may be interconnected for stability by horizontal braces or the like, and which have foot plates 13 for floor supporting the frame.

A generally horizontal, perforate drum 14 is mounted on the frame for rotation about central axis 15 thereof in, for example, the direction of arrow 16 (FIG. 6).

The drum comprises an assembly of elongated tubular elements 17 extending continuously between infeed end 18 of the drum and outlet end 19. The tubular elements may comprise cylindrical tubes which, as particularly shown in FIG. 7, are hollow, although the tubes could be solid without departing from the invention. The tubes are preferably hollow, however, for weight and cost saving purposes. Also, the tubes need not be of circular cross-section but could be oval or the like, so long as elements 17 have continuous arcuate surfaces along the entire length thereof facing inwardly of the drum to present a plurality of curved surfaces against which the ice-covered products are tumbled for freeing ice particles therefrom as the ice-laden products are tossed against such curved surfaces during tumbling. Also, tubular elements need not all be of the same diametral size, but rounded tubes of larger cross-section could alternate with rounded tubes of smaller cross-section, without departing from the invention.

What is important according to the invention is for tubular elements 17 to have curved or convex surfaces facing inwardly of the drum, compared to flat surfaces provided by flat slats, to carry out the objectives of the invention.

Tubular elements 17 lie parallel to central axis 15 of the drum and are mutually spaced apart to define uniform gaps or slots 21 therebetween.

The tubular elements are assembled together to form cylindrical side wall 22 of the drum by ring means 23 spaced along axis 15 of the drum, as shown in FIG. 5. As detailed in FIG. 6, each ring means comprise a plurality of circular segments 24 having spaced apart concave surfaces receiving a plurality, such as four, tubular elements welded or otherwise secured to segments 24. The segments are joined end-to-end by a ring 25, which may be scalloped along its outer surface, as shown, to save weight and material. A band 26 presenting an outer, smooth ring surface overlies ring 25 and is secured thereto in some suitable manner.

The drum may be encased within frame end walls 27, 28, frame side walls 29, 31, a frame top wall 32, and a frame bottom wall 33.

End wall 27 has an inlet chute 34 through which ice-covered products are metered into the interior of the drum. And, end wall 28 has a chute 35 through which the products removed from ice particles are discharged into a receptacle (not shown) or the like.

Bottom wall 33 is formed as a trough for collecting the separated ice particles and for directing the particles through an ice chute 30 to an ice collecting station.

A toothed gear ring 36 is fixedly mounted at one end of the drum, and intermeshes with a pinion gear 37 driven by a suitable motor 38 mounted on side wall 29.

A pair of rollers 39, 41 (FIG. 2) are mounted on opposing pairs of frame legs 12 by some suitable collar 42 (FIG. 4) secured as at 43 to its respective frame leg. A threaded rod 44 may extend through the collar to which a clevis 45 is attached for supporting its roller 39 or 41 for free rotation about the roller axis. One or more nuts 46 threaded to rod 44 may be provided for vertical adjustment of the roller in bearing engagement with band 26.

Each roller pair 39, 41 typically mounted as shown in FIG. 4 on opposing pairs of frame legs 12 beneath ring means 23 are spaced apart, shown in FIGS. 2 and 6, for cradling the drum on the frame.

The drum may be disposed horizontally, as shown in FIG. 1, or may be slightly inclined downwardly from horizontal from its infeed end 18 to its outlet end 19. In any case products 47, FIGS. 6 and 7, which may be poultry products such as breast shells and necks, laden with ice particles 48, are metered into the drum through inlet chute 34 while the drum is rotated in the direction of arrow 16 by drive motor 38 operating at a predetermined rpm for rotating the drum at a given rotary speed under the given circumstances. As the drum rotates it causes the ice-covered products to tumble within the drum, bombarding against the curved surfaces of tubular elements 17 as the products separate while falling whereupon ice particles 48 separate from the products and fall under gravity through slots 21 and into the trough formed at bottom 33 to be directed via chute 30 to an ice collecting station.

The ice laden products fed into the drum generally collect near infeed end 18 and eventually advance during drum rotation toward and out through outlet end 19 so as to be directed via chute 35 outwardly of the drum as products substantially free of ice particles are readied for further processing, such as a meat separator.

A helical flange 49, extending between opposing ends of the drum (FIG. 5), having helical turns formed in direction 16 of rotation, may be secured in some suitable manner within the drum to the inner rounded surfaces of tubular elements 17 (FIG. 6). This helical flighting within the drum both prevents product from advancing through the drum too quickly before the ice particles are separated through tumbling, and assures the forward advancing movement of the product within the drum toward outlet end 19.

In the event product, or portions thereof such as skin or bone, become lodged in gaps 21 during the ice removal process, means are provided for automatically dislodging the product or some portion thereof from the gaps in an efficient and energy-free manner. Such means comprise one or more star wheels 51 (FIGS. 1 and 6) fixed to a central axle 52 rotatably mounted at opposing ends to the end walls of the frame. The star wheels, which may be of a non-metallic material such as a hard elastomeric, each have a plurality of outwardly extending radial teeth 53 projecting from intervening concave surfaces 54. Axle 52 lies parallel to central axis 15 of the drum and is spaced from that axis a distance permitting teeth 54 of the star wheel or wheels to project into gaps 21 between tubular elements 17 a sufficient distance without interference with the tubular elements.

The star wheels are mounted externally of the drum and rotate in the direction of arrow 55 (FIG. 6) as the teeth or projections 53 are engaged by tubular elements 17 during drum rotation. Thus, any products or portions thereof which may be lodged in the gaps between elements 17 are dislodged by the projecting teeth of the star wheel or wheels automatically during each turn of the drum. By locating the star wheels above the drum, the dislodged products are caused to conveniently drop by gravity into the drum interior.

From the foregoing it can be seen that a simple and efficient yet highly reliable de-icer has been provided in the form of a slotted tumbler drum having spaced tubular elements forming its cylindrical side wall and defining open slots or gaps through which removed ice particles fall as the ice-covered products are thrown against rounded surfaces of the tubular elements upon tumbling. The gaps between the tubular elements may be set depending on the type of comestible products to be de-iced.

Although poultry products have been described for de-icing according to the invention, other comestible such as fruit products, especially raspberries, can be deiced according to the invention without damaging the fruit.

The rounded surfaces of the tubular elements against which the products are tumbled present parallel lines of contact, rather than flat surfaces, to the tumbling products for concentrating the clinging ice particles against these bearing lines to assure ice removal quickly and efficiently.

The elements comprising the cylindrical side wall of the drum need not be in the form of tubes but could be formed of a plurality of spaced apart split tubes so long as the rounded surfaces thereof face inwardly of the drum for the purpose intended by the invention.

The flight of the helical flange can be set to hasten or retard the advance of product toward the outlet end of the drum, depending on the product to be de-iced and other circumstances. And, the drum can be rotated at a given speed as suitable for de-icing a given product.

Obviously, many other modifications and variations of the present invention are made possible in the light of the above-teachings. It is therefore to be understood that within the scope of the appended claims the invention may be practice otherwise than as specific described.

What is claimed is:

1. A rotary de-icer for separating ice particles from comestible products adhering to such particles, comprising, a generally horizontal perforate drum mounted on an upstanding frame for rotation about a central axis of the drum, means on said frame at one end of said drum for metering comestible products having ice particles adhered thereto into the interior of the drum, motor means on said frame engageable with for rotating the drum about the central axis thereof for tumbling the products having ice particles adhered thereto within the drum, said drum having cylindrical side wall means for removing the adhered ice particles from the comestible products within the drum during the tumbling and for collecting only the ice removed comestible products within the drum, said side wall means comprising an assembly of elongated tubular elements lying parallel to said central axis and extending between said one end and an opposing end of the drum, each of said elements having a continuous arcuate surface extending along the length thereof facing inwardly of the drum to present a plurality of curved surfaces having parallel lines of contact against which the products having ice particles adhered thereto impact during the tumbling to thereby remove the adhered particles from the products, said elements being mutually spaced apart to define uniformly sized longitudinal gaps therebetween for collecting the ice removed products within the drum as the removed particles fall by gravity during the tumbling through the gaps, means on said frame directly beneath the drum for collecting the removed ice particles, and means on said frame at the opposing end of said drum for discharging the products from which ice particles have been removed outwardly of the drum.

2. The de-icer according to claim 1, wherein said elongated tubular elements of said cylindrical side wall means comprise hollow tubes of circular cross-section.

3. The de-icer according to claim 2, further comprising at least one freely rotatable star wheel mounted on said frame in engagement with said tubes for rotation by said drum about an axis parallel to said central axis, said wheel having radially outwardly projecting teeth mutually spaced apart a distance substantially the same as the spacing between said tubes and extending successively into said gaps for dislodging any products or particles thereat.

4. The de-icer according to claim 3, wherein said star wheel is located above a horizontal plane containing said central axis of said drum to cause dislodged products or particles to drop into the interior of said drum.

5. The de-icer according to claim 1, further comprising a helical flange supported within said drum against said curved surfaces of said elongated tubular elements to assist in advancing the products having ice particles adhered thereto from said infeed end toward said outlet end during drum rotation.

6. The de-icer according to claim 1, further comprising freely rotatable means mounted on said frame outwardly of said drum, said rotatable means engaging said side wall for rotation by said drum about an axis parallel to said central axis, and said rotatable means having projections extending into said gaps for dislodging any products or particles thereat.

7. The de-icer according to claim 6, wherein said freely rotatable means comprises at least one star wheel, said projections comprising radially outwardly projecting teeth on the periphery of said wheel mutually spaced apart a distance substantially the same as the spacing between said elements.

8. The de-icer according to claim 1, wherein said assembly of tubular elements further comprises a plurality of outer ring means spaced along the central axis of the drum, rollers mounted on said frame for cradle supporting said drum on said frame, said rollers bearing against smooth outer surfaces of said ring means.

9. The de-icer according to claim 8, further comprising a plurality of freely rotatable star wheels mounted on said frame in engagement with said elements for rotation by said drum about an axis parallel to said central axis, said wheels being located in spaces between said ring means, each of said wheels having radially outwardly projecting teeth mutually spaced apart a distance substantially the same as the spacing between said elements and extending successively into said gaps for dislodging any products or particles thereat.

10. The de-icer according to claim 9, wherein said star wheels are located above said drum to cause dislodged products to drop into the interior of said drum.

* * * * *